US012489558B2

(12) United States Patent
Dhere et al.

(10) Patent No.: US 12,489,558 B2
(45) Date of Patent: Dec. 2, 2025

(54) EFFICIENT SIGNALING FOR MU-MIMO ENHANCED RECEIVERS

(71) Applicant: Nokia Technologies Oy, Espoo (FI)

(72) Inventors: Amol Dhere, Aalborg (DK); Axel Mueller, Massy (FR); Bent Henneberg Rysgaard, Aalborg (DK); Stig Blücher Brink, Aalborg (DK); Karsten Petersen, Aalborg (DK); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/585,811

(22) Filed: Feb. 23, 2024

(65) Prior Publication Data

US 2024/0291589 A1    Aug. 29, 2024

Related U.S. Application Data

(60) Provisional application No. 63/448,441, filed on Feb. 27, 2023.

(51) Int. Cl.
| | |
|---|---|
| *H04L 1/00* | (2006.01) |
| *H03M 13/09* | (2006.01) |
| *H04B 7/0452* | (2017.01) |
| *H04L 1/1812* | (2023.01) |

(52) U.S. Cl.
CPC .......... *H04L 1/0061* (2013.01); *H03M 13/09* (2013.01); *H04B 7/0452* (2013.01); *H04L 1/1819* (2013.01)

(58) Field of Classification Search
CPC ..... H04L 1/0061; H04L 1/1819; H03M 13/09
See application file for complete search history.

(56) References Cited

U.S. PATENT DOCUMENTS

| | | | |
|---|---|---|---|
| 2016/0205680 A1* | 7/2016 | Nguyen | H04W 72/0446 370/280 |
| 2017/0208500 A1* | 7/2017 | Jung | H04L 25/0204 |
| 2019/0223033 A1* | 7/2019 | Nam | H04B 7/0805 |
| 2020/0358503 A1* | 11/2020 | Hao | H04W 72/23 |
| 2021/0112528 A1* | 4/2021 | Lee | H04W 72/23 |

* cited by examiner

*Primary Examiner* — Guerrier Merant
*Assistant Examiner* — Jack Kensington Barnett
(74) *Attorney, Agent, or Firm* — Carter, DeLuca & Farrell LLP

(57) ABSTRACT

An apparatus may be configured to: receive, from a network, an indication of one or more sets of ports, wherein the one or more sets of ports are grouped; receive, from the network, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports; and determine the set of at least one of the one or more sets of ports based, at least partially, on the at least one parameter for port interference detection.

1 Claim, 7 Drawing Sheets

```
-- ASN1START
-- TAG-DMRS-DOWNLINKCONFIG-START

DMRS-DownlinkConfig ::=         SEQUENCE {
    dmrs-Type                       ENUMERATED {type2}
OPTIONAL,     -- Need S
    dmrs-AdditionalPosition         ENUMERATED {pos0, pos1, pos3}
OPTIONAL,     -- Need S
    maxLength                       ENUMERATED {len2}
OPTIONAL,     -- Need S
    scramblingID0                   INTEGER (0..65535)
OPTIONAL,     -- Need S
    scramblingID1                   INTEGER (0..65535)
OPTIONAL,     -- Need S
    phaseTrackingRS                 SetupRelease { PTRS-DownlinkConfig }
OPTIONAL,     -- Need M
    ...,
    [[
    dmrs-Downlink-r16               ENUMERATED {enabled}
OPTIONAL     -- Need R
    ]]
}

-- TAG-DMRS-DOWNLINKCONFIG-STOP
-- ASN1STOP
```

```
┌─────────────────────────────────┐
│ determine one or more sets of   │  710
│ ports for a user equipment      │
└─────────────────────────────────┘
                │
                ▼
┌─────────────────────────────────┐
│ transmit, to the user equipment,│
│ an indication of the one or more│
│ sets of ports for the user      │  720
│ equipment, wherein the one or   │
│ more sets of ports are grouped  │
└─────────────────────────────────┘
                │
                ▼
┌─────────────────────────────────┐
│ transmit, to the user equipment,│
│ at least one parameter for port │
│ interference detection, wherein │
│ the at least one parameter for  │
│ port interference detection     │
│ comprises at least one of:      │
│                                 │
│    a scrambled cyclic redundancy│
│    code,                        │  730
│                                 │
│    a number of interfered ports,│
│                                 │
│    a set index for a set of at  │
│    least one of the one or more │
│    sets of ports, or            │
│                                 │
│    an indication of a selected  │
│    set of the one or more sets  │
│    of ports                     │
└─────────────────────────────────┘
```

FIG. 7

EFFICIENT SIGNALING FOR MU-MIMO ENHANCED RECEIVERS

BACKGROUND

It is known, in radio resource control level signaling, to provide some interference parameters.

FIELD OF EMBODIMENTS

The example and non-limiting embodiments relate generally to network communications and, more particularly, to inter-user interference.

BRIEF SUMMARY OF EMBODIMENTS

The following summary is merely intended to be illustrative. The summary is not intended to limit the scope of the claims.

In accordance with one aspect, an apparatus comprising: at least one processor; and at least one memory storing instructions that, when executed by the at least one processor, cause the apparatus at least to: receive, from a network, an indication of one or more sets of ports, wherein the one or more sets of ports are grouped; receive, from the network, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports; and determine the set of at least one of the one or more sets of ports based, at least partially, on the at least one parameter for port interference detection.

In accordance with one aspect, a method comprising: receiving, with a user equipment from a network, an indication of one or more sets of ports, wherein the one or more sets of ports are grouped; receiving, from the network, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

In accordance with one aspect, an apparatus comprising means for performing: receiving, from a network, an indication of one or more sets of ports, wherein the one or more sets of ports are grouped; receiving, from the network, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

In accordance with one aspect, a non-transitory computer-readable medium comprising program instructions stored thereon for performing at least the following: causing receiving, from a network, of an indication of one or more sets of ports, wherein the one or more sets of ports are grouped; causing receiving, from the network, of at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

In accordance with one aspect, an apparatus comprising: at least one processor; and at least one memory storing instructions that, when executed by the at least one processor, cause the apparatus at least to: determine one or more sets of ports for a user equipment; transmit, to the user equipment, an indication of the one or more sets of ports for the user equipment, wherein the one or more sets of ports are grouped; and transmit, to the user equipment, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports.

In accordance with one aspect, a method comprising: determining one or more sets of ports for a user equipment; transmitting, to the user equipment, an indication of the one or more sets of ports for the user equipment, wherein the one or more sets of ports are grouped; and transmitting, to the user equipment, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports.

In accordance with one aspect, an apparatus comprising means for performing: determining one or more sets of ports for a user equipment; transmitting, to the user equipment, an indication of the one or more sets of ports for the user equipment, wherein the one or more sets of ports are grouped; and transmitting, to the user equipment, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports.

In accordance with one aspect, a non-transitory computer-readable medium comprising program instructions stored thereon for performing at least the following: determining one or more sets of ports for a user equipment; causing transmitting, to the user equipment, of an indication of the one or more sets of ports for the user equipment, wherein the one or more sets of ports are grouped; and causing transmitting, to the user equipment, of at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports.

According to some aspects, there is provided the subject matter of the independent claims. Some further aspects are defined in the dependent claims.

BRIEF DESCRIPTION OF THE SEVERAL VIEWS OF THE DRAWINGS

The foregoing aspects and other features are explained in the following description, taken in connection with the accompanying drawings, wherein:

FIG. 2 is a diagram illustrating features as described herein;

FIG. 7 is a flowchart illustrating steps as described herein.

DETAILED DESCRIPTION OF EMBODIMENTS

Figure 1:
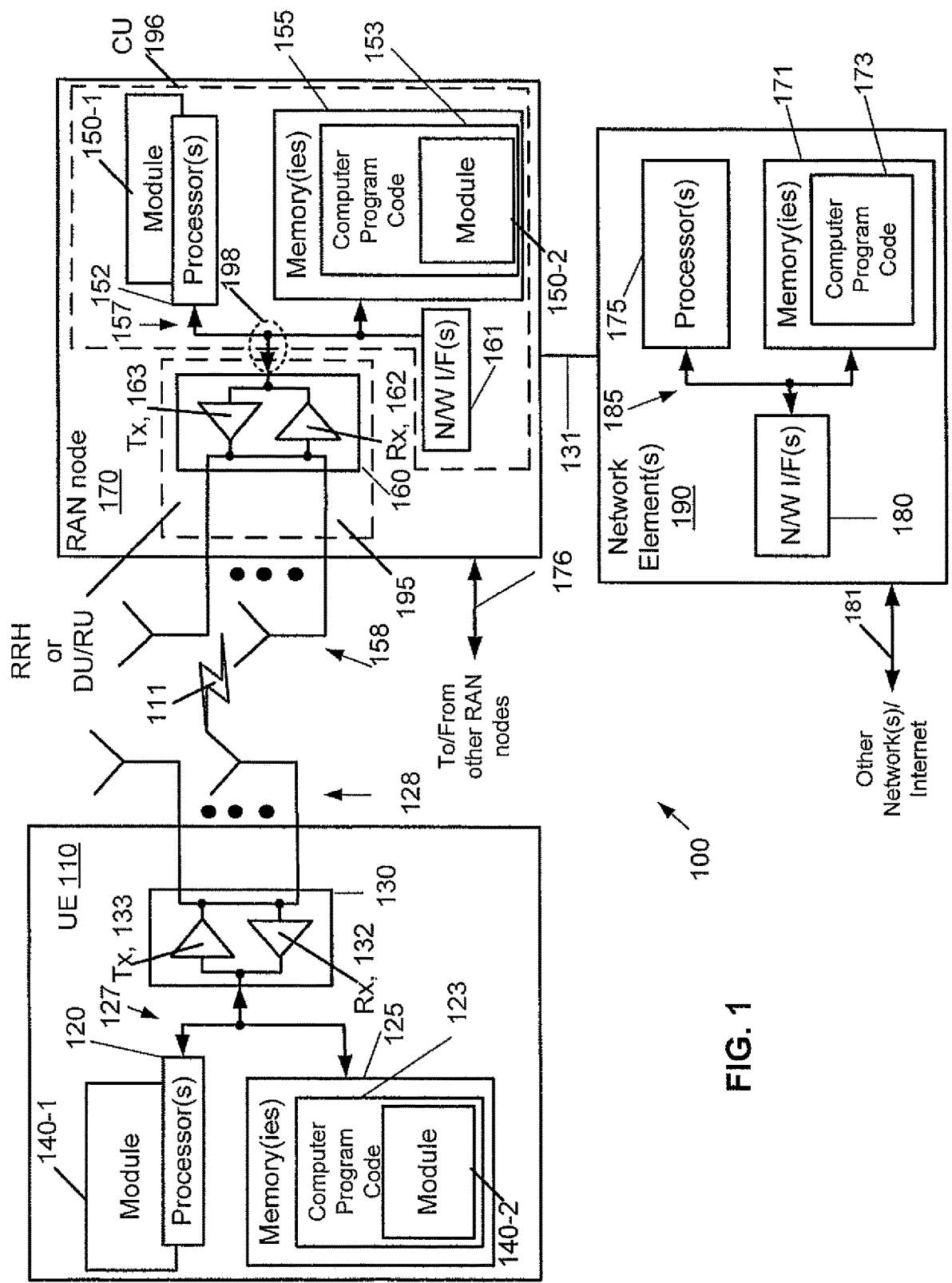
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
6G sixth generation
AMF access and mobility management function
CI-RNTI cell specific interferer presence radio network temporary identifier
CRAN cloud radio access network
CRC cyclic redundancy code
C-RNTI cell radio network temporary identifier
CRS cell specific reference signal
CSI-RS channel state information reference signal
CU central unit
DCI downlink control indicator
DL downlink
DMRS demodulation reference symbol
DU distributed unit
E-LMMSE-IRC enhanced linear minimum mean square error interference rejection combining
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-MMSE-IRC enhanced minimum mean square error interference rejection combining
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
IE information element
I/F interface
IS interference suppression
L1 layer 1
LMMSE-IRC linear minimum mean square error interference rejection combining
LTE long term evolution
MAC medium access control
ML maximum likelihood
MLM MAC layer management
MME mobility management entity
MMSE-IRC minimum mean square error interference rejection combining
MU-MIMO multiuser multiple input multiple output
MUST multiuser superposition transmission
NAICS network assisted interference cancellation and suppression
ng or NG new generation
ng-eNB or NG-eNB new generation eNB
NR new radio
N/W or NW network
O-RAN open radio access network
PDCP packet data convergence protocol
PDSCH physical downlink shared channel
PHY physical layer
PMI precoding matrix indicator
QPSK quadrature phase shift keying
RAN radio access network
RB resource block
RE resource element
RF radio frequency
RI rank indicator
RLC radio link control
R-ML reduced complexity maximum likelihood
RNTI radio network temporary identifier
RRC radio resource control
RRH remote radio head
RS reference signal
RU radio unit
Rx receiver
SDAP service data adaptation protocol
SGW serving gateway
SIB system information block
SLIC symbol level interference cancellation
SMF session management function
Tx transmitter
UE user equipment (e.g., a wireless, typically mobile device)
UPF user plane function
VNR virtualized network function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. A "circuit" may include dedicated hardware or hardware in association with software executable thereon. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR), and/or 5G-Advanced (i.e. NR Rel-18 and beyond) and/or 6G. In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station, access point, access node, or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360-degree area so that the single base station's coverage area covers an approximate oval or circle. Furthermore, each cell can correspond to a single carrier and a base station may use multiple carriers. So, if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. For example, a network may be deployed in a tele cloud, with virtualized network functions (VNF) running on, for example, data center servers. For example, network core functions and/or radio access network(s) (e.g. CloudRAN, O-RAN, edge cloud) may be virtualized. Note that the virtualized entities that result from the network virtualization are still implemented, at some level, using hardware such as processors 152 or 175 and memories 155 and 171, and also such virtualized entities create technical effects.

It may also be noted that operations of example embodiments of the present disclosure may be carried out by a plurality of cooperating devices (e.g. cRAN).

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various example embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Having thus introduced one suitable but non-limiting technical context for the practice of the example embodiments of the present disclosure, example embodiments will now be described with greater specificity.

Features as described herein generally relate to receivers used in multi-user multiple input multiple output (MU-MIMO) scenarios. In RP-221288, it was proposed to study the performance requirements in MU-MIMO scenario for NR using advanced receivers to cancel inter-user interference:

" . . . . Considering the demodulation requirement enhancement in Rel-18, for the purpose of further enhancing DL throughput and coverage performance, it is beneficial to study and specify (if feasible) requirements for more advanced UE receiver for following scenario:

MU-MIMO scenario: Further improve the performance with advanced receiver to cancel inter-user interference . . . "

RP-221288 further elaborates that the performance gain of E-MMSE-IRC or R-ML receivers should be studied:

" . . . Evaluate and specify advanced receiver to cancel inter-user interference for MU-MIMO Phase I: Study the performance gain, reference receiver assumption, interference modeling, testability, required signalling overhead, as well as impact on other WGs Further discuss reference receiver assumption with below candidates

E-MMSE-IRC

R-ML

Target scenario: Focus on slot based transmission

Phase II (if any pending on the conclusion for phase I):

Specify PDSCH demodulation requirements under MU-MIMO scenario with advanced receiver Note: As baseline, performance requirements shall be specified under single reference receiver assumption. This baseline can be revisited at RAN #100 if necessary . . . "

These receivers were also studied under LTE for network assisted interference cancellation and suppression (NAICS) as well as for MU-MIMO. They were defined in an LTE NAICS study, TR 36.829, to perform joint demodulation of the target and interference layers by using knowledge of interference parameters:

" . . . Interference Suppression (IS) receivers

IS receivers refer to receivers that apply linear filtering to the received signal to suppress the interference, as opposed to explicitly cancel the interference. Three types of IS receivers are identified:

LMMSE-IRC:

It is baseline for Rel-11 MMSE-IRC study (refer to TR36.829).

No knowledge of interferer parameter(s) is required.

Enhanced LMMSE-IRC (E-LMMSE-IRC):

MMSE-IRC that explicitly considers interferer channel estimates and other interferer knowledge.

Interference parameters that can enable interferer channel estimation are needed, including, for example, its DMRS or CRS with PMI/RI.

Maximum Likelihood (ML) receivers

ML-type of receivers are non-linear in nature. Three types of ML receivers are also identified:

ML:

Full-blown joint detection of useful and interference signals in accordance with the ML criterion Interference parameters that can enable interferer channel estimation and interferer detection at symbol level (e.g. modulation) are needed.

Reduced complexity ML (R-ML):

Reduced complexity joint detection of useful and interference modulation symbols in accordance to the ML criterion (e.g. sphere decoding, QR-MLD, MLM, etc.) . . . "

These advanced receivers need interference parameters to enable channel estimation and cancelation or suppression of interference. TR 36.866 outlines the study done by various companies for LTE NAICS, and shows the performance of blind detection of various interference parameters. Many companies highlighted the problem of performance degradation when using blind detection under LTE NAICS study (36.866) (e.g. R4-136207, R4-135099). Some others reported marginal difference between a receiver using blind detection, as compared to a genie receiver with prior knowledge of interference parameters (e.g. R4-136900).

LTE NAICS introduced interference parameters to RRC re-configuration signaling, which gave information about possible transmission modes and cell specific reference (CRS) ports. No dynamic signaling (e.g. MAC CE and/or DCI based) was introduced to give these parameters at run time.

LTE NAICS introduced RRC level signaling of interference parameters like transmission mode, CRS ports, and/or power allocation list in an RRC connection reconfiguration message. However, no dynamic signaling was introduced to tell the target UE about the actual parameters at run time. This means that enhanced receivers using knowledge of interference parameters may have to blindly detect the actual parameters from the shortlisted candidates at run time.

The interference parameters were also identified in LTE intra cell MU-MIMO study, TR 36.859. Specifically, a UE near a base station, which is paired with a UE farther away, may need information such as existence/processing of multiuser superposition transmission (MUST) interference per spatial layer; transmission power allocation of its physical downlink shared channel (PDSCH) and MUST far UE's PDSCH; modulation order of each codeword; and/or demodulation reference signal (DMRS) information of MUST-far UE.

Some interference related parameters may be blindly detected by the UE, and some must be signaled to the UE. These interference related parameters may need to be known at the receiver. However, no signaling of these parameters for the MU-MIMO scenario was defined in TR 36.859:

" . . . MUST-near UE:
R-ML/SLIC receiver
  Information of each paired MUST-far UE
    Existence/processing of MUST interference per spatial layer
    Transmission power allocation of its PDSCH and MUST far UE's PDSCH
    It may be information per spatial layer if different power can be allocated to each spatial layer.
    Spatial precoding vector(s)
      Codebook subset restriction(s)
      Full rank PMI used for virtualization of transmit diversity
    Modulation order of each codeword
      Only if not restricted to QPSK only.
    Resource allocation
    If all the scheduled RBs of the MUST-near UE have superposed transmission and all assistance information of all the paired far UEs is the same, this information is not needed
    DMRS information of MUST-far UE
      Only if DMRS information is used to estimate effective channel of MUST-far UE or to derive power allocation of MUST-far UE
    PDSCH RE mapping information
      Only if it is different from its own PDSCH RE mapping information, e.g. PDSCH starting symbol or PDSCH RE mapping at DMRS RE
    Transmission scheme
      Only if mixed transmission schemes, e.g. transmit diversity and closed-loop spatial multiplexing
    Enhanced HARQ information
      Only if needed . . . "

For the NR RAN4 work item on Advanced receivers for MU-MIMO, signaling/detection of following interference UE parameters may be needed: existence of interference; DMRS ports configuration and/or sequence; power allocation ratio of PDSCH to target UE PDSCH; and/or modulation order. Blind detection of these parameters may not be favorable.

It may be noted that, in a case of intra-cell inter-user interference where all parameters are available at the gNB, assistance information may be expected to be provided by the network to the UE.

MU-MIMO is a very dynamic scenario where ports might change every slot, for example to follow changes in quality of each layer, and thereby to adjust the transmission ranks of co-scheduled UEs. Accordingly, signaling using DCI may be better suited as compared to MAC CE or RRC based signaling. In DCI, every bit counts, so reducing the number of bits added to DCI signaling may be necessary.

Because the interference parameters can change from slot to slot, signaling them dynamically (e.g. using DCI) may result in significant signaling overhead.

RRC signaling can provide a short list of possible interference parameters; the actual parameters may then be blindly detected from the short list at run time, or the parameters may be fully/partially indicated via run time or close to run time signaling. Run time signaling may be understood as payload or scrambling of DCI. Close to run time signaling may be understood as MAC layer signaling, e.g., MAC CE or RRC configuration. From the cost and efficiency perspective of the UE, it is advantageous to minimize the blind detection.

Example embodiments of the present disclosure may have the technical effect of providing efficient signaling of the existence of interference, to the network, while minimizing or canceling the use of blind detection at the UE. Additionally or alternatively, example embodiments of the present disclosure may have the technical effect of providing DMRS ports configuration and/or sequence, to the network, while minimizing the use of blind detection at the UE.

In an example embodiment, RRC based signaling of interference parameters (e.g. the existence of interference, and/or DMRS port configuration/sequence) may be performed; this may have the technical effect of causing minimal or no changes to DCI formats.

Long term parameters like PRB bundling size, and frequency and time allocation of co-scheduled UEs layers, may be signaled using RRC. Similarly, DMRS power boosting of interference DMRS ports may be detected by measuring power ratio of DMRS to PDSCH over multiple slots. But the exact interference DMRS ports being used may require efficient signaling to reduce the blind detection search space. In an example embodiment, the interference DMRS ports being used may be indicated via dynamic signaling (e.g. MAC CE and/or DCI).

In an example embodiment, signaling of presence of interference may be performed via direct inclusion of a bit in DCI, which may have the technical effect of changing the DCI length.

In an example embodiment, signaling of presence of interference may be performed via introduction of a cell specific interferer presence radio network temporary identifier (CI-RNTI); each UE may be allocated CI-RNTI in addition to a legacy cell radio network temporary identifier (C-RNTI). If DCI for UE is scrambled with C-RNTI, it may be determined that there is no interference present. If DCI for UE is scrambled with CI-RNTI, it may be determined that there is interference present.

In an example embodiment, signaling of an interference DMRS port configuration may be performed via use of a new grouping of ports into sets of ports, and then indexing into these sets. Logic may also be provided/configured to UEs to recreate the interferer's DMRS port configuration from the sets and indices, for example in UE specification. This reconstruction may be unique in many cases, but not necessarily all. When it is not, for example where a set and index pair describes two or more possible port configurations at the same time, performance may still be improved in comparison to not using the set and index pair. A technical effect of example embodiments of the present disclosure may be to reduce port indication information requirements.

In an example embodiment, signaling of an interference DMRS port configuration may be performed via signaling of the index (and optionally the sets) in DCI. This may be achieved by direct inclusion of bits in DCI, which may have the technical effect of changing the length of the DCI payload.

In an example embodiment, the set and set index signaling may be generalized to also cover alternative signaling via RRC configuration or MAC CE. In other words, a MAC CE may be used in place of a RRC reconfiguration message to indicate the set and set index (see, e.g., FIG. 4), or a combination of a RRC reconfiguration message and a MAC CE may be used to indicate the set or sub-set and set index may be indicated using DCI (see, e.g., FIG. 5). For example, in a hybrid case, sets may be configured per RRC configuration, and indexing may be performed by MAC CE or DCI (see, e.g., FIG. 3).

In an example embodiment, an RRC connection configuration, including re-configuration, or another suitable RRC or SIB message, may include one or more sets of antenna port combinations (e.g. sets of sets of antenna ports). Sets may be grouped by their size (i.e., based on the number of antenna ports they contain). Additionally or alternatively, an RRC connection configuration, or another suitable RRC or SIB message, may include an optional interference scrambling ID. This may be a reference to the scrambling IDs in the DMRS-DownlinkConfig IE if it is configured. For example, FIG. 2 illustrates an example of a downlink DMRS configuration as in R17 TS 38.331. Additionally or alternatively, an RRC connection configuration or another suitable RRC or SIB message may include an interference detection configuration. This may be blind or assisted/aided. Optionally, each set may contain N ports, which may be mutually exclusive from other sets containing N ports.

In an example embodiment, an actual antenna port to be used by a target UE may be signaled using DCI. Existing DCI format (e.g. Format 1_1) may be used unchanged in some scenarios, while simple extensions may be added to signal interference presence in other scenarios. In an example embodiment, a gNB may send the target UE its allocation of antenna ports using DCI format for PDSCH allocation.

In the present disclosure, the terms "interference port" and "interfered port" are interchangeably used to refer to an antenna port experiencing interference. An antenna port may be a physical feature of a device, or may be a virtualization of one or more physical antenna ports, including any additional signal processing (i.e. for DMRS ports that may include precoding onto many physical antenna ports) and even the channel.

In an example embodiment, if the assisted/aided method of interference ports detection is configured for the target UE, then one or more of the following options may be possible. One option may be scrambling of the cyclic redundancy code (CRC) of the DCI by a special CI-RNTI. Multiple CI-RNTIs may also be configured to the target UE, for example corresponding to the number of interference layers. Another option may be adding a single element to the DCI format to indicate number of interference layers. Another option may be a combination of the above options: interference radio network temporary identifier (RNTI) may signal presence of a single interference layer, and an optional new element (e.g. in DCI) may signal a number of interference layers in case the number is more than 1. In other words, by default the interference layer may be considered to be 1, unless an element is included (e.g. in DCI) to indicate a different number of interference layers. Another option may be adding an optional single element to DCI indicating the set index of the intended/target antenna port combination. This may be used to indicate an index within the superset containing the indicated number of antenna ports N.

In an example embodiment, a UE may read its list of $N_{target}$ number of allocated antenna ports from a DCI (i.e. the number of (DMRS) ports that are intended for the UE). If the interference port DMRS scrambling ID is configured by a higher layer, then the UE may use this to determine a single interference antenna port. If blind detection is configured by higher layers, then the UE may find all the preconfigured sets containing the target UE ports. The remaining antenna ports in these sets may be the possible interference ports. Blind detection may then be performed for these interference antenna ports. If the assisted/aided method is enabled, the UE may read the DCI to determine the presence of interference and the number of interference layers, $N_{intf}$. The number of interference layers $N_{intf}$ may be equal to the number of interference ports. The UE may find the superset of all sets with $N=N_{intf}+N_{target}$ antenna ports containing its allocated $N_{target}$ ports. If all sets with N ports are mutually exclusive, then the superset may have only 1 set. The remaining (non-target) ports in this set may then indicate the interference ports. Else, if the sets with N ports are not mutually exclusive and a (optional) set index is present in DCI, the UE may read this to find the specific set within the superset. Else, if the sets with N ports are not mutually exclusive and a set index is not included in DCI, the UE may read all the sets within the superset to find the possible interference ports. Blind detection of interference ports may then be performed (i.e. full blind detection on all the RRC configured sets).

Sending a set index to the UE is optional. Sending it may reduce the need of blind detections, as it may enable distinguishing between feasible sets of ports in the selected group(s); accordingly, not sending a set index may have the technical effect of increasing blind decoding in cases in which there are non-unique remaining sets of ports. However, signaling a set index increases the possible payloads of signaling, which may lead to an increase in the search space of DCI decoding, if DCI is used for signaling and no fixed maximum value of the set index is known (e.g., UE was not informed of payload increase before decoding via RRC or MAC CE signaling).

Figure 3:
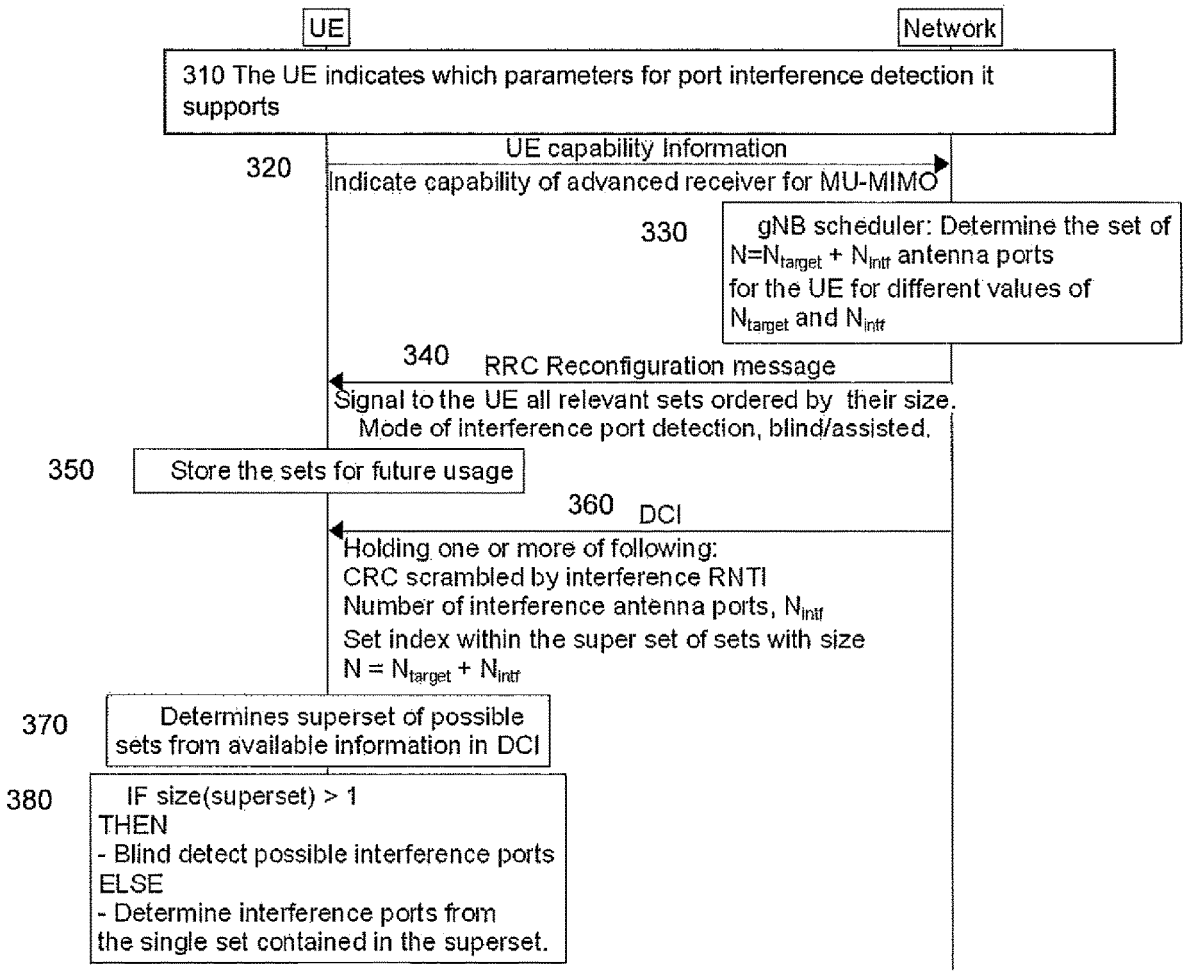
FIG. 3 is a flowchart illustrating steps as described herein.

In an example embodiment, sets of DMRS port combinations may be added to a RRC connection reconfiguration message. FIG. 3 illustrates a generalized flowchart showing a method of using sets of target and interference antenna ports. A technical effect of example embodiments of the present disclosure may be to provide the fastest possible adaptation to new parameters, even from slot to slot. As can be seen from FIG. 3, just the indication of presence of interference may be enough to help the UE to determine the interference ports. This may also be possible when the sets having N ports are not mutually exclusive.

At 310, the UE may indicate which parameters for port interference detection it supports. For example, the UE may support identifying interfered ports based on sets of ports and/or indexes of ports. For example, the UE may support receiving one or more parameters configured to indicate or imply the existence and/or non-existence of interference. For example, the UE may support receiving one or more parameters configured to indicate port configuration(s). For example, the UE may support receiving one or more parameters configured to indicate one or more sets of antenna port combinations.

At 320, the UE transmits, to the network, UE capability information, which may indicate a capability of using an advanced receiver for MU-MIMO. At 330, a gNB scheduler may determine the set of $N=N_{target}+N_{intf}$ antenna ports for the UE for different values of $N_{target}$ and $N_{intf}$. At 340, the network may transmit an RRC Reconfiguration message to the UE. The RRC Reconfiguration message may signal to the UE all relevant sets grouped by their size, and/or the mode of interference port detection, for example blind or assisted/aided. At 350, the UE may store the sets for future usage. At 360, the network may transmit, to the UE, a DCI, which may include one or more of the following: CRC scrambled by CI-RNTI; number of interference antenna ports, $N_{intf}$; and/or set index within the superset of sets with size $N=N_{target}+N_{intf}$. At 370, the UE may determine a superset of possible sets from the information available in the DCI. At 380, if the size of the superset is greater than one, then the UE may perform blind detection of possible interference ports. Else, if the size of the superset is equal to 1, the UE may determine interference ports from the single set contained in the superset. The UE may then perform blind detection for the determined antenna port(s).

Example embodiments of the present disclosure may optionally be extended to channel state information reference signal (CSI-RS) ports. That is, CSI-RS ports configured for target and interference UE may be divided into sets which are signaled using RRC. And then, the target UE may determine the CSI-RS ports that are experiencing interference at the UE based on its own CSI-RS port allocation and the index of the active set, which may be configured using RRC signaling. Accordingly, only the port numbering may need to be adjusted (DM-RS number 0+x/1000+x to CSI-RS numbers 3000+x).

A technical effect of example embodiments of the present disclosure may be to exclude the need to signal PRB bundling size via DCI or MAC CE, as this is slowly changing and may be configured via RRC signaling instead.

A technical effect of example embodiments of the present disclosure may be to treat signaling of DMRS power boosting as being of low importance, as measuring of data power and DM-RS power over several slots, while considering DM-RS port configurations; this information may be revealed without the need for signaling.

A technical effect of example embodiments of the present disclosure may be to allow up-front signaling of the exact interference antenna port configuration (e.g. set), while still allowing flexibility in allocating the antenna ports (e.g. index).

A technical effect of example embodiments of the present disclosure may be to require minimum change to existing DCI formats if assisted/aided detection of interference is needed.

A technical effect of example embodiments of the present disclosure may be to enable interference DMRS ports to be signaled to the UE by just signaling the presence of interference.

A technical effect of example embodiments of the present disclosure may be to minimize the signaling elements added to DCI.

In an example, a configuration may be provided for a Type1 single front loaded DMRS symbol. For example, there may be six groups configured. For example, there may be two ports that are mutually exclusive between the configured sets: {1000, 1001}, {1002, 1003}. For example, there may be three ports that are not mutually exclusive between the configured sets: {1000, 1002, 1003}, {1001, 1002, 1003}, {1000, 1001, 1003}. For example, there may be four ports: {1000, 1001, 1002, 1003}.

In this example, the super-set may be: {{1000, 1001}, {1002, 1003}, {1000, 1002, 1003}, {1001, 1002, 1003}, {1000, 1001, 1003}, {1000, 1001, 1002, 1003}}; the sets in the superset may be grouped by port size in 3 groups. In other words, the sets including two ports are grouped together, the sets including three ports are grouped together, etc. In the present example, a first group is included in the superset with 2 port containing sets, i.e., {1000, 1001}, {1002, 1003}. A second group is included in the superset with 3 port sets, i.e., {1000, 1002, 1003}, {1001, 1002, 1003}, {1000, 1001, 1003}. A third group is included in the superset with 4 port sets {1000, 1001, 1002, 1003}. A fourth group optionally included in the superset may be {1000, 1001}, {1002, 1003}, {1000, 1001, 1002, 1003}. Other grouping(s) may be possible. For example, the sets of ports in the superset may be grouped into groups containing the ports allocated to the served UE, or to have groups of equal size. Grouping to have groups of equal size may involve an additional bit size (one blind decoding of PDCCH).

Groups may be a list of DM-RS ports used cell wide for PDSCH/data; in the present example, they are grouped based on how many MIMO layers/ports used cell wide they represent (i.e., both served ports/MIMO layers and all interference ports/MIMO layers).

N=N_target+N_intf may be used as an index into groups, as it represents the number of used MIMO layers/ports cell wide. N=rank own+rank all interference, where rank may be equal to the number of MIMO layers used.

If the set index into the super-set containing 6 sets was to be signaled directly, this may require 3 additional bits in the DCI. In the following examples, the interference port may be determined based on information present in the DCI; additional bits required in DCI may also be given.

In an example embodiment, all possible groupings may be configured at initial cell attachment of the served UE (e.g., by RRC configuration), but these groupings/subgroupings/sets/subsets may be (further) selected at run time (e.g., using RRC re-configuration, MAC CE, DCI, etc.).

A set index may index into a group of the groups of the superset. In other words, the set index may indicate a set of ports. It may be noted that the size of the superset may be greater than or equal to the size of a subset of the superset (i.e. a group within the superset).

Selection or further selection of groups/sets/subsets and signaling of set index (e.g., in MAC CE or DCI) may have the technical effect of avoiding the need for blind detection, which may reduce high speed signaling needs, such that only signaling of interference presence may be needed.

In an example in which the (transmission) rank is 1, the port is 1000, the interference presence is indicated using CI-RNTI, and there are 0 additional bits, $N_{intf}$ may be determined to be 1 and N=2. The sets with N=2 may be mutually exclusive. Hence, set_index may be 1, and the interference port=1001.

In this example, neither set index nor $N_{intf}$ was signaled. Only an indication that there is interference, and the RRC configuration (with potential MAC CE (further) selection) of groups, may be provided to the UE. This means the $N_{intf}$ may be determined using blind detection, and then N may be derived by summing the served UE rank of 1, or N_target=1, with $N_{intf}$=1. There may be no need for set index signaling or blind detection, as of the following selection of sets of ports that contain the target/served UE port, only one set of ports remains.

In an example in which the rank is 1, the port is 1001, $N_{intf}$ is 2, and there are 2 additional bits, N may be determined to be 3. Based on its own ports, the UE may determine the superset to be {{1001, 1002, 1003}, {1000, 1001, 1003}}. Blind detection of interference ports between {1002, 1003} and {1000, 1003} may be performed.

In this example, the information of rank 1 of the served/target UE, which may be derived from being assigned only one port, here 1001, give the N_target=1. N_intf, the number of interfering ports or MIMO layers, is signaled to be 2 (from the network in assisted mode), which requires an additional payload of 2 bits to encode this information (e.g. in DCI). The maximum additional payload in type 1 DM-RS is 4 bits, to encode up to 16 ports. The port number N may be found to be 3, as the sum of N_target and N_intf. N may be used to (further) select in the configured groups/sets/subsets, which are grouped along/according to the port number. Among this selected group, all sets of ports that do not include the target port(s) may be excluded as non-feasible. As no set index is signaled in this example, the UE may need to use blind detection to further select among the feasible sets of ports.

In an example in which the rank is 1, the port is 1002, $N_{intf}$ is 2, the set_index is 2, and there are 3 additional bits, N may be determined to be 3. Based on its own ports, the UE may determine the superset to be {{1000, 1002, 1003}, {1001, 1002, 1003}}. Set_index=2 may determine the interference ports to be 1001, 1003.

In this example, we need 2 additional signaling payload bits to signal N_intf=2, and 1 additional payload bit to signal set index=2. N_target is 1 from only having one port served, and N_intf is signaled, giving N=3 and thus selecting the group containing 3 ports. Removing sets of ports that do not contain the target port of 1002, leaves two feasible sets: {1000, 1002, 1003}, {1001, 1002, 1003}. Set index=2 indicates that the second of these feasible sets is to be selected. This choice is unique and no blind detection is necessary.

In an example in which the rank is 2, the ports are 1000, 1001, the interference presence is signaled using CI-RNTI, and there are 0 additional bits, $N_{intf}$ may be determined to be 1 and N=3. Based on its own ports, the UE may determine the superset to be {{1000, 1001, 1003}}. The interference port may be determined to be 1003.

In an example embodiment, it may be possible to mix signaling at different levels to form a similar example embodiment to that illustrated in FIG. 3. This is shown in FIGS. 4 and 5.

Figure 4:
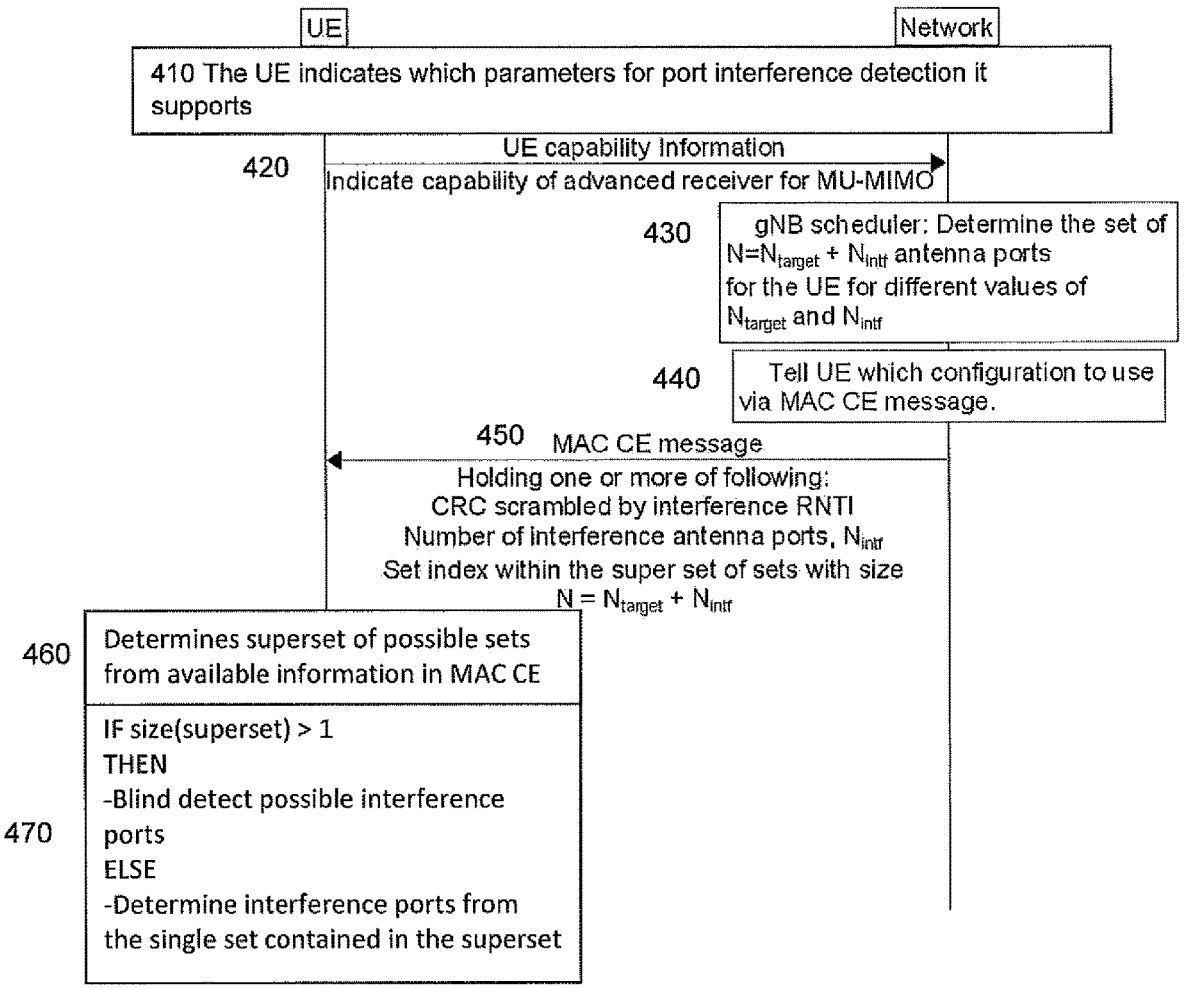
FIG. 4 is a flowchart illustrating steps as described herein.

Referring now to FIG. 4, illustrated is an example in which MAC CE signaling is used. Accordingly, the parameters may not be changed from slot to slot, but may still be dynamic and adaptable. At 410, the UE may indicate which parameters for port interference detection it supports. At 420, the UE may transmit, to the network, UE capability information, which may indicate the capability of advanced receiver for MU-MIMO. At 430, a gNB scheduler may determine the set of $N=N_{target}+N_{intf}$ antenna ports for the UE for different values of $N_{target}$ and $N_{intf}$. At 440, the network may indicate, to the UE, which configuration to use, for example via MAC CE message. At 450, the network may transmit, to the UE, a MAC CE message, which may include one or more of the following: CRC scrambled by CI-RNTI; number of interference antenna ports, $N_{intf}$; and/or set index within the super set of sets with size $N=N_{target}+N_{intf}$. At 460, the UE may determine a superset of possible sets based on the information available in the MAC CE. At 470, if the size of the superset is greater than one, then the UE may perform blind detection of possible interference ports. Else, if the size of the superset is equal to 1, the UE may determine interference ports from the single set contained in the superset.

Figure 5:
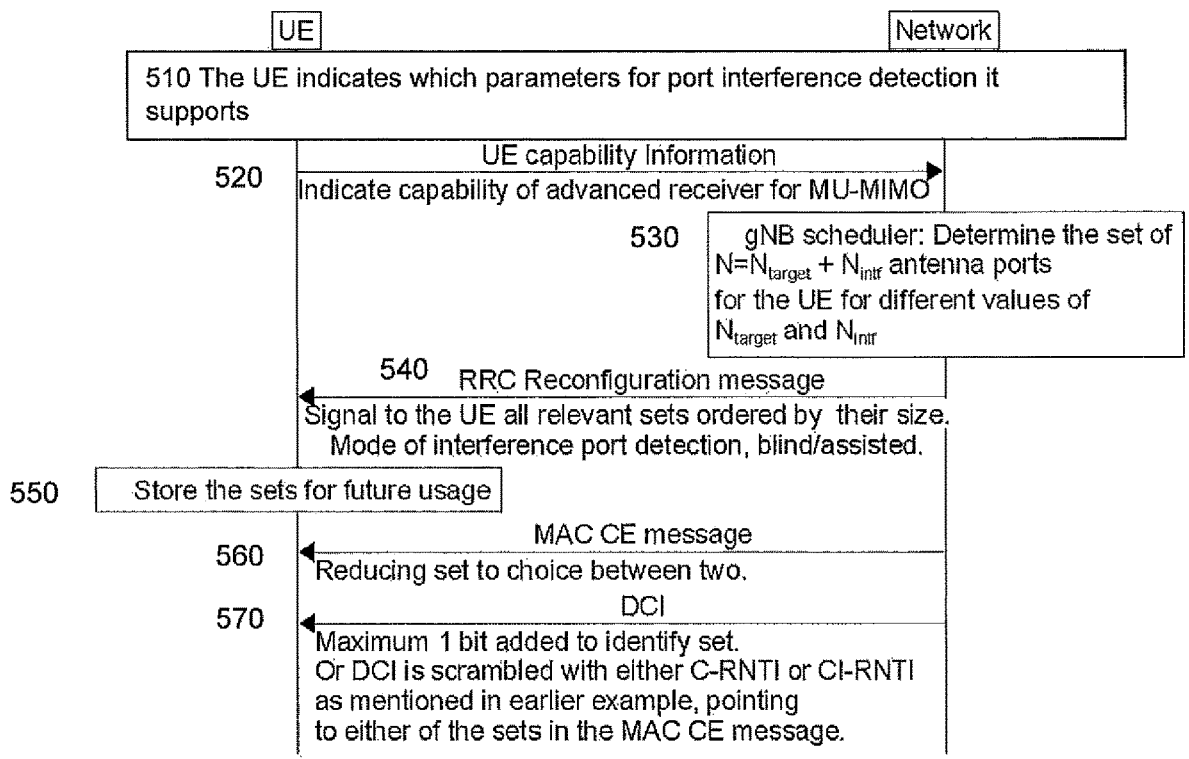
FIG. 5 is a flowchart illustrating steps as described herein.

Referring now to FIG. 5, illustrated is an example in which the dynamics of the radio interface is of a nature such that the network may select a superset at RRC level, indicate a subset via MAC CE, and pin-point the used set via max 1 bit in DCI. At 510, the UE may indicate which parameters for port interference detection it supports. At 520, the UE may transmit, to the network, UE capability information, which may indicate the capability of advanced receiver for MU-MIMO. At 530, a gNB scheduler may determine the set of $N=N_{target}+N_{intf}$ antenna ports for the UE for different values of $N_{target}$ and $N_{intf}$. At 540, the network may transmit, to the UE, an RRC Reconfiguration message, which may signal to the UE all relevant sets grouped by their size, and/or a mode of interference port detection, for example blind/assisted. At 550, the UE may store the sets for future usage. At 560, the network may transmit, to the UE, a MAC CE message, which may reduce the set to a choice between two. At 570, the network may transmit, to the UE, a DCI, which may include a maximum of 1 bit added to identify the set. Alternatively, the DCI may be scrambled with either C-RNTI or CI-RNTI, where use of one or the other may point to either of the sets indicated in the MAC CE message.

Figure 6:
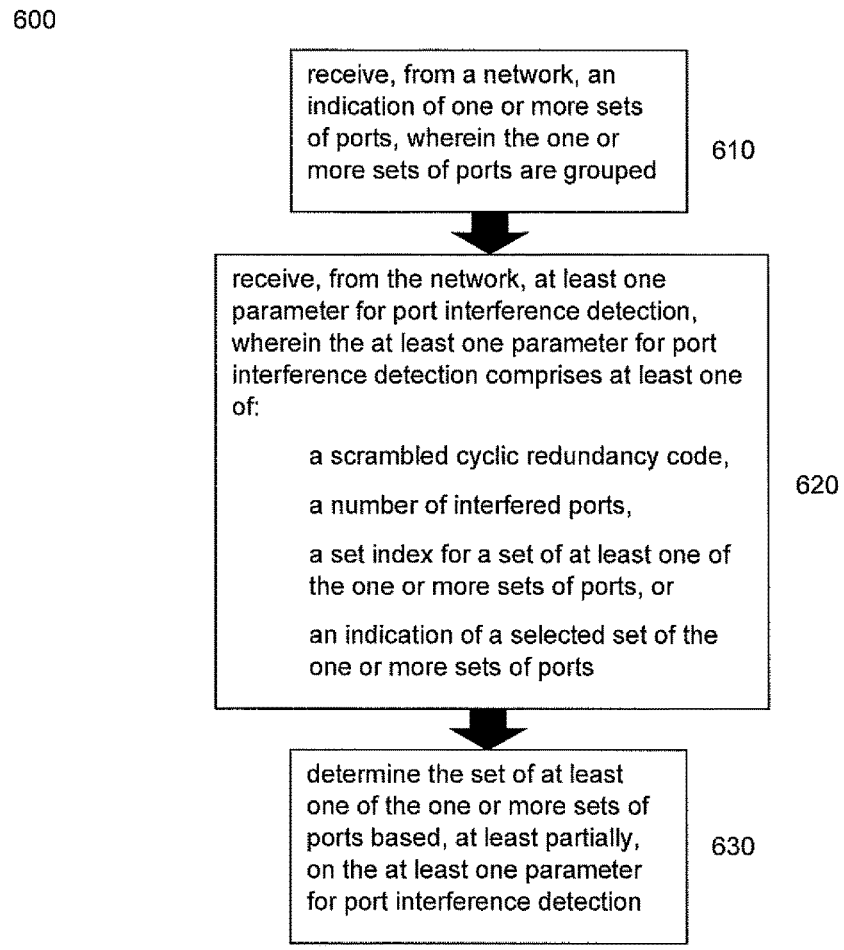
FIG. 6 is a flowchart illustrating steps as described herein.

FIG. 6 illustrates the potential steps of an example method 600. The example method 600 may include: receiving, from a network, an indication of one or more sets of ports, wherein the one or more sets of ports are grouped, 610; receiving, from the network, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports, 620; and determining the set of at least one of the one or more sets of ports based, at least partially, on the at least one parameter for port interference detection, 630. The example method 600 may be performed, for example, with a UE.

FIG. 7 illustrates the potential steps of an example method 700. The example method 700 may include: determining one or more sets of ports for a user equipment, 710; transmitting, to the user equipment, an indication of the one or more sets of ports for the user equipment, wherein the one or more sets of ports are grouped, 720; and transmitting, to the user equipment, at least one parameter for port interference detection, wherein the at least one parameter for port interference detection comprises at least one of: a scrambled cyclic redundancy code, a number of interfered ports, a set index for a set of at least one of the one or more sets of ports, or an indication of a selected set of the one or more sets of ports, 730. The example method 700 may be performed, for example, with a network entity, a base station, a gNB, a gNB scheduler, etc.

In accordance with one example embodiment, an apparatus may comprise: at least one processor; and at least one memory storing instructions that, when executed by the at least one processor, cause the apparatus at least to: receive, from a network, an indication of one or more sets of ports, wherein the one or more sets of ports may be grouped; receive, from the network, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determine the set of at least one of the one or more sets of ports based, at least partially, on the at least one parameter for port interference detection.

The example apparatus may be further configured to: transmit, to the network, an indication of a capability for performing reception for multi-user multiple input multiple output operation.

The one or more sets of ports may be grouped based on size.

The example apparatus may be further configured to: receive, from the network, an indication to determine at least one selected set of at least one of the one or more sets of ports; and determine the at least one selected set based, at least partially, on the at least one parameter for port interference detection.

The example apparatus may be further configured to: in response to a size of the determined set being more than one, perform blind detection of interference of the determined set.

The example apparatus may be further configured to: in response to the size of the determined set being one, determine at least one port for interference detection from the determined set.

The example apparatus may be further configured to: receive an interference presence scrambling identifier, wherein the determined set comprises one port, wherein the one port may be determined based, at least partially, on the interference presence scrambling identifier.

A first set of the one or more sets of ports and a second set of the one or more sets of ports may comprise a same number of ports, wherein the first set and the second set may be mutually exclusive sets of ports.

The determining of the set of at least one of the one or more sets of ports may comprise the example apparatus being further configured to: determine at least one first set of the one or more sets of ports that comprises at least one target port; and determine the set of at least one of the one or more sets of ports based on the determined at least one first set of ports.

The example apparatus may be further configured to: receive an indication of a mode of port interference detection, wherein the mode of port interference detection may comprise one of: a blind detection mode, or an assisted detection mode.

The indicated mode of port interference detection comprises an assisted detection mode, wherein the determining of the set of the at least one of the one or more sets of ports may comprise the example apparatus being further configured to: determine one or more feasible sets of the one or more sets of ports; and determine the set of the one or more sets of ports based on the set index within the one or more feasible sets.

The indication of the mode of port interference detection may be received via a medium access control control element message.

The one or more sets of ports may comprise demodulation reference symbol ports.

The one or more sets of ports may comprise channel state information reference signal ports.

The indication of the one or more sets of ports may be received via one of: a radio resource control configuration, or a system information block.

The at least one parameter for port interference detection may be received via a downlink control information message.

The downlink control information message may further comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection may comprise the indication of the selected set of the one or more sets of ports, wherein the determining of the set of at least one of the one or more sets of ports may the example apparatus being further configured to: receive an indication of one set of ports of the selected set of ports, wherein the determined set may comprise the one set of ports.

In accordance with one aspect, an example method may be provided comprising: receiving, with a user equipment from a network, an indication of one or more sets of ports, wherein the one or more sets of ports may be grouped; receiving, from the network, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

The example method may further comprise: transmitting, to the network, an indication of a capability for performing reception for multi-user multiple input multiple output operation.

The one or more sets of ports may be grouped based on size.

The example method may further comprise: receiving, from the network, an indication to determine at least one selected set of at least one of the one or more sets of ports; and determine the at least one selected set based, at least partially, on the at least one parameter for port interference detection.

The example method may further comprise: in response to a size of the determined set being more than one, performing blind detection of interference of the determined set.

The example method may further comprise: in response to the size of the determined set being one, determining at least one port for interference detection from the determined set.

The example method may further comprise: receiving an interference presence scrambling identifier, wherein the determined set may comprise one port, wherein the one port is determined based, at least partially, on the interference presence scrambling identifier.

A first set of the one or more sets of ports and a second set of the one or more sets of ports may comprise a same number of ports, wherein the first set and the second set may be mutually exclusive sets of ports.

The determining of the set of at least one of the one or more sets of ports may comprise: determining at least one first set of the one or more sets of ports that comprises at least one target port; and determining the set of at least one of the one or more sets of ports based on the determined at least one first set of ports.

The example method may further comprise: receiving an indication of a mode of port interference detection, wherein the mode of port interference detection may comprise one of: a blind detection mode, or an assisted detection mode.

The indicated mode of port interference detection may comprise an assisted detection mode, wherein the determining of the set of the at least one of the one or more sets of ports may comprise: determining one or more feasible sets of the one or more sets of ports; and determining the set of the one or more sets of ports based on the set index within the one or more feasible sets.

The indication of the mode of port interference detection may be received via a medium access control control element message.

The one or more sets of ports may comprise demodulation reference symbol ports.

The one or more sets of ports may comprise channel state information reference signal ports.

The indication of the one or more sets of ports may be received via one of: a radio resource control configuration, or a system information block.

The at least one parameter for port interference detection may be received via a downlink control information message.

The downlink control information message may further comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection may comprise the indication of the selected set of the one or more sets of ports, wherein the determining of the set of at least one of the one or more sets of ports may comprise: receiving an indication of one set of ports of the selected set of ports, wherein the determined set may comprise the one set of ports.

In accordance with one example embodiment, an apparatus may comprise: circuitry configured to perform: receiving, with a user equipment from a network, an indication of one or more sets of ports, wherein the one or more sets of ports may be grouped; circuitry configured to perform: receiving, from the network, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and circuitry configured to perform: determining the set of at least one of the one or more sets of ports based, at least partially, on the at least one parameter for port interference detection.

In accordance with one example embodiment, an apparatus may comprise: processing circuitry; memory circuitry including computer program code, the memory circuitry and the computer program code configured to, with the processing circuitry, enable the apparatus to: receive, from a network, an indication of one or more sets of ports, wherein the one or more sets of ports may be grouped; receive, from the network, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determine the set of at least one of the one or more sets of ports based, at least partially, on the at least one parameter for port interference detection.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving, from a network, an indication of one or more sets of ports, wherein the one or more sets of ports may be grouped; receiving, from the network, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

The means may be further configured to perform: transmitting, to the network, an indication of a capability for performing reception for multi-user multiple input multiple output operation.

The one or more sets of ports may be grouped based on size.

The means may be further configured to perform: receiving, from the network, an indication to determine at least one selected set of at least one of the one or more sets of ports; and determine the at least one selected set based, at least partially, on the at least one parameter for port interference detection.

The means may be further configured to perform: in response to a size of the determined set being more than one, performing blind detection of interference of the determined set.

The means may be further configured to perform: in response to the size of the determined set being one, determining at least one port for interference detection from the determined set.

The means may be further configured to perform: receiving an interference presence scrambling identifier, wherein the determined set comprises one port, wherein the one port may be determined based, at least partially, on the interference presence scrambling identifier.

A first set of the one or more sets of ports and a second set of the one or more sets of ports may comprise a same number of ports, wherein the first set and the second set may be mutually exclusive sets of ports.

The means configured to perform determining of the set of at least one of the one or more sets of ports may be further configured to perform: determining at least one first set of the one or more sets of ports that comprises at least one target port; and determining the set of at least one of the one or more sets of ports based on the determined at least one first set of ports.

The means may be further configured to perform: receiving an indication of a mode of port interference detection, wherein the mode of port interference detection may comprise one of: a blind detection mode, or an assisted detection mode.

The indicated mode of port interference detection comprises an assisted detection mode, wherein the means configured to perform determining of the set of the at least one of the one or more sets of ports may be further configured to perform: determining one or more feasible sets of the one or more sets of ports; and determining the set of the one or more sets of ports based on the set index within the one or more feasible sets.

The indication of the mode of port interference detection may be received via a medium access control control element message.

The one or more sets of ports may comprise demodulation reference symbol ports.

The one or more sets of ports may comprise channel state information reference signal ports.

The indication of the one or more sets of ports may be received via one of: a radio resource control configuration, or a system information block.

The at least one parameter for port interference detection may be received via a downlink control information message.

The downlink control information message may further comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection may comprise the indication of the selected set of the one or more sets of ports, wherein the means configured to perform determining of the set of at least one of the one or more sets of ports may comprise means configured to perform: receiving an indication of one set of ports of the selected set of ports, wherein the determined set may comprise the one set of ports.

A processor, memory, and/or example algorithms (which may be encoded as instructions, program, or code) may be provided as example means for providing or causing performance of operation.

In accordance with one example embodiment, a non-transitory computer-readable medium comprising instructions stored thereon which, when executed with at least one processor, cause the at least one processor to: cause receiving, from a network, of an indication of one or more sets of ports, wherein the one or more sets of ports may be grouped; cause receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determine the set of at least one of the one or more sets of ports based, at least partially, on the at least one parameter for port interference detection.

In accordance with one example embodiment, a non-transitory computer-readable medium comprising program instructions stored thereon for performing at least the following: causing receiving, from a network, of an indication of one or more sets of ports, wherein the one or more sets of ports may be grouped; causing receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

In accordance with another example embodiment, a non-transitory program storage device readable by a machine may be provided, tangibly embodying instructions executable by the machine for performing operations, the operations comprising: causing receiving, from a network, of an indication of one or more sets of ports, wherein the one or more sets of ports may be grouped; causing receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

In accordance with another example embodiment, a non-transitory computer-readable medium comprising instructions that, when executed by an apparatus, cause the apparatus to perform at least the following: causing receiving, from a network, of an indication of one or more sets of ports, wherein the one or more sets of ports may be grouped; causing receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

A computer implemented system comprising: at least one processor and at least one non-transitory memory storing instructions that, when executed by the at least one processor, cause the system at least to perform: causing receiving, from a network, of an indication of one or more sets of ports, wherein the one or more sets of ports may be grouped; causing receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and determining the set of at least one of the one or more sets of ports based, at least partially, on the at least one parameter for port interference detection.

A computer implemented system comprising: means for causing receiving, from a network, of an indication of one or more sets of ports, wherein the one or more sets of ports may be grouped; means for causing receiving, from the network, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports; and means for determining the set of at least one of the one or more sets of ports based, at least partially, on the at least one parameter for port interference detection.

In accordance with one example embodiment, an apparatus may comprise: at least one processor; and at least one memory storing instructions that, when executed by the at least one processor, cause the apparatus at least to: determine one or more sets of ports for a user equipment; transmit, to the user equipment, an indication of the one or more sets of ports for the user equipment, wherein the one or more sets of ports may be grouped; and transmit, to the user equipment, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

The example apparatus may be further configured to: receive, from a user equipment, an indication of a capability for performing reception for multi-user multiple input multiple output operation.

The one or more sets of ports may be grouped based on size.

The example apparatus may be further configured to: transmit, to the user equipment, an indication to determine at least one selected set of at least one of the one or more sets of ports.

The example apparatus may be further configured to: transmit, to the user equipment, an interference presence scrambling identifier, wherein the interference presence scrambling identifier may be configured to indicate an interfered port.

A first set of the one or more sets of ports and a second set of the one or more sets of ports may comprise a same number of ports, wherein the first set and the second set may be mutually exclusive sets of ports.

The example apparatus may be further configured to: transmit, to the user equipment, an indication of a mode of port interference detection, wherein the mode of port interference detection may comprise one of: a blind detection mode, or an assisted detection mode.

The indication of the mode of port interference detection may be transmitted via a medium access control element message.

The one or more sets of ports may comprise demodulation reference symbol ports.

The one or more sets of ports may comprise channel state information reference signal ports.

The indication of the one or more sets of ports may be transmitted via one of: a radio resource control configuration, or a system information block.

The at least one parameter for port interference detection may be transmitted via a downlink control information message.

The downlink control information message may further comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection may comprise the indication of the selected set of the one or more sets of ports, wherein the example apparatus may be further configured to: transmit an indication of one set of ports of the selected set of ports, wherein the set of at least one of the one or more sets of ports may comprise the one set of ports.

In accordance with one aspect, an example method may be provided comprising: determining one or more sets of ports for a user equipment; transmitting, to the user equipment, an indication of the one or more sets of ports for the user equipment, wherein the one or more sets of ports may be grouped; and transmitting, to the user equipment, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

The example method may further comprise: receiving, from a user equipment, an indication of a capability for performing reception for multi-user multiple input multiple output operation.

The one or more sets of ports may be grouped based on size.

The example method may further comprise: transmitting, to the user equipment, an indication to determine at least one selected set of at least one of the one or more sets of ports.

The example method may further comprise: transmitting, to the user equipment, an interference presence scrambling identifier, wherein the interference presence scrambling identifier may be configured to indicate an interfered port.

A first set of the one or more sets of ports and a second set of the one or more sets of ports may comprise a same number of ports, wherein the first set and the second set may be mutually exclusive sets of ports.

The example method may further comprise: transmitting, to the user equipment, an indication of a mode of port interference detection, wherein the mode of port interference detection may comprise one of: a blind detection mode, or an assisted detection mode.

The indication of the mode of port interference detection may be transmitted via a medium access control element message.

The one or more sets of ports may comprise demodulation reference symbol ports.

The one or more sets of ports may comprise channel state information reference signal ports.

The indication of the one or more sets of ports may be transmitted via one of: a radio resource control configuration, or a system information block.

The at least one parameter for port interference detection may be transmitted via a downlink control information message.

The downlink control information message may further comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection may comprise the indication of the selected set of the one or more sets of ports, further comprising: transmitting an indication of one set of ports of the selected set of ports, wherein the set of at least one of the one or more sets of ports may comprise the one set of ports.

In accordance with one example embodiment, an apparatus may comprise: circuitry configured to perform: determining one or more sets of ports for a user equipment; circuitry configured to perform: transmitting, to the user equipment, an indication of the one or more sets of ports for the user equipment, wherein the one or more sets of ports may be grouped; and circuitry configured to perform: transmitting, to the user equipment, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

In accordance with one example embodiment, an apparatus may comprise: processing circuitry; memory circuitry including computer program code, the memory circuitry and the computer program code configured to, with the processing circuitry, enable the apparatus to: determine one or more sets of ports for a user equipment; transmit, to the user equipment, an indication of the one or more sets of ports for the user equipment, wherein the one or more sets of ports may be grouped; and transmit, to the user equipment, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

In accordance with one example embodiment, an apparatus may comprise means for performing: determining one or more sets of ports for a user equipment; transmitting, to the user equipment, an indication of the one or more sets of ports for the user equipment, wherein the one or more sets of ports may be grouped; and transmitting, to the user equipment, at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

The means may be further configured to perform: receiving, from a user equipment, an indication of a capability for performing reception for multi-user multiple input multiple output operation.

The one or more sets of ports may be grouped based on size.

The means may be further configured to perform: transmitting, to the user equipment, an indication to determine at least one selected set of at least one of the one or more sets of ports.

The means may be further configured to perform: transmitting, to the user equipment, an interference presence scrambling identifier, wherein the interference presence scrambling identifier may be configured to indicate an interfered port.

A first set of the one or more sets of ports and a second set of the one or more sets of ports may comprise a same number of ports, wherein the first set and the second set may be mutually exclusive sets of ports.

The means may be further configured to perform: transmitting, to the user equipment, an indication of a mode of port interference detection, wherein the mode of port interference detection may comprise one of: a blind detection mode, or an assisted detection mode.

The indication of the mode of port interference detection may be transmitted via a medium access control element message.

The one or more sets of ports may comprise demodulation reference symbol ports.

The one or more sets of ports may comprise channel state information reference signal ports.

The indication of the one or more sets of ports may be transmitted via one of: a radio resource control configuration, or a system information block.

The at least one parameter for port interference detection may be transmitted via a downlink control information message.

The downlink control information message further may comprise an indication that interference is present.

The scrambled cyclic redundancy code may be scrambled with a cell specific interferer presence radio network temporary identifier, wherein the downlink control information message may be configured to indicate that interference is present.

The cell specific interferer presence radio network temporary identifier may be associated with the number of interfered ports.

The cell specific interferer presence radio network temporary identifier may be configured to indicate that the number of interfered ports is one.

The scrambled cyclic redundancy code may be scrambled with a cell radio network temporary identifier, wherein the downlink control information message may be configured to indicate that interference is not present.

The at least one parameter for port interference detection may be received via a medium access control control element.

The at least one parameter for port interference detection comprises the indication of the selected set of the one or more sets of ports, wherein the means may be further configured to perform: transmitting an indication of one set of ports of the selected set of ports, wherein the set of at least one of the one or more sets of ports may comprise the one set of ports.

In accordance with one example embodiment, a non-transitory computer-readable medium comprising instructions stored thereon which, when executed with at least one processor, cause the at least one processor to: determine one or more sets of ports for a user equipment; cause transmitting, to the user equipment, of an indication of the one or more sets of ports for the user equipment, wherein the one or more sets of ports may be grouped; and cause transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

In accordance with one example embodiment, a non-transitory computer-readable medium comprising program instructions stored thereon for performing at least the following: determining one or more sets of ports for a user equipment; causing transmitting, to the user equipment, of an indication of the one or more sets of ports for the user equipment, wherein the one or more sets of ports may be grouped; and causing transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

In accordance with another example embodiment, a non-transitory program storage device readable by a machine may be provided, tangibly embodying instructions executable by the machine for performing operations, the operations comprising: determining one or more sets of ports for a user equipment; causing transmitting, to the user equipment, of an indication of the one or more sets of ports for the user equipment, wherein the one or more sets of ports may be grouped; and causing transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

In accordance with another example embodiment, a non-transitory computer-readable medium comprising instructions that, when executed by an apparatus, cause the apparatus to perform at least the following: determining one or more sets of ports for a user equipment; causing transmitting, to the user equipment, of an indication of the one or more sets of ports for the user equipment, wherein the one or more sets of ports may be grouped; and causing transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

A computer implemented system comprising: at least one processor and at least one non-transitory memory storing instructions that, when executed by the at least one processor, cause the system at least to perform: determining one or more sets of ports for a user equipment; causing transmitting, to the user equipment, of an indication of the one or more sets of ports for the user equipment, wherein the one or more sets of ports may be grouped; and causing transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

A computer implemented system comprising: means for determining one or more sets of ports for a user equipment; means for causing transmitting, to the user equipment, of an indication of the one or more sets of ports for the user equipment, wherein the one or more sets of ports may be grouped; and means for causing transmitting, to the user equipment, of at least one parameter for port interference detection, wherein the at least one parameter for port interference detection may comprise at least one of: a scrambled cyclic redundancy code, a number of interfered ports, a set index for a set of at least one of the one or more sets of ports, or an indication of a selected set of the one or more sets of ports.

The term "non-transitory," as used herein, is a limitation of the medium itself (i.e. tangible, not a signal) as opposed to a limitation on data storage persistency (e.g., RAM vs. ROM).

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. An apparatus comprising:
   at least one processor;
   and at least one non-transitory memory storing instructions that, when executed by the at least one processor, cause the apparatus at least to:
   receive, from a network, an indication of one or more sets of ports, wherein the one or more sets of ports are grouped, wherein the one or more sets of ports are grouped based on size;
   receive, from the network, at least one parameter for port interference detection, wherein the at least one parameter for port interference detection comprises:
   a scrambled cyclic redundancy code,
   a number of interfered ports,
   a set index for a set of at least one of the one or more sets of ports,
   and an indication of a selected set of the one or more sets of ports;
   determine the set of at least one of the one or more sets of ports based, at least partially, on the at least one parameter for port interference detection;
   transmit, to the network, an indication of a capability for performing reception for multi-user multiple input multiple output operation;
   determine at least one selected set based, at least partially, on the at least one parameter for port interference detection;
   and receive an indication of a mode of port interference detection, wherein the mode of port interference detection comprises one of:
   a blind detection mode,
   or an assisted detection mode,
   wherein the determining of the set of the at least one of the one or more sets of ports comprises:
   determine one or more feasible sets of the one or more sets of ports;
   and determine the set of the one or more sets of ports based on the set index within the one or more feasible sets,
   wherein the indication of the mode of port interference detection is received via a medium access control control element (MAC CE) message,
   wherein the one or more sets of ports comprise demodulation reference symbol ports,
   wherein the one or more sets of ports comprise channel state information reference signal ports,
   wherein the indication of the one or more sets of ports is received via one of:
   a radio resource control configuration, or a system information block,
   wherein the at least one parameter for port interference detection is received via a downlink control information message,
   and wherein the downlink control information message further comprises an indication that interference is present,
   wherein the scrambled cyclic redundancy code is scrambled with a cell specific interferer presence radio network temporary identifier.

* * * * *